United States Patent [19]

Teramura et al.

[11] 4,236,248
[45] Nov. 25, 1980

[54] TRANSMISSION SPEED SWITCHING SYSTEM

[76] Inventors: Hiroichi Teramura, 3-22-18, Kugahara, Ota-ku, Tokyo-to; Yasuhiro Yamazaki, 19-42, Sodegahama, Hiratsuka-shi, Kanagawa-ken; Yasushi Wakahara, 3-17-23, Takanoda, Nerima-ku, Tokyo-to, all of Japan

[21] Appl. No.: 898,020

[22] Filed: Apr. 20, 1978

[30] Foreign Application Priority Data

Apr. 25, 1977 [JP] Japan .................................. 52/47682

[51] Int. Cl.$^3$ ............................................. H04L 27/18
[52] U.S. Cl. ........................................ 375/53; 375/86
[58] Field of Search ......... 179/2 DP, 15 BR, 15 BW; 325/38 R; 178/69.1, 50; 340/147, 152; 364/200 MS; 375/53.86, 44

[56] References Cited

U.S. PATENT DOCUMENTS

| | | |
|---|---|---|
| 3,359,543 | 12/1967 | Corr et al. |
| 3,775,751 | 11/1973 | Anderson .......................... 340/172.5 |
| 3,987,422 | 10/1976 | Yanagidaira et al. ............ 340/207 P |
| 4,001,504 | 1/1977 | Hendrickson ......................... 178/68 |

Primary Examiner—Benedict V. Safourek

[57] ABSTRACT

A transmission speed switching system for a transmission system having at each party of said transmission system a plurality of data MODEMs of different transmission speeds $b_1, b_2, \ldots b_n$, in which a carrier is modulated by a code train at intervals of a time S equal to a common multiple of symbol intervals $S_1, S_2, \ldots S_n$ respectively corresponding to the transmission speeds in a manner to obtain a predetermined modulated wave which instructs said MODEMs of the other party the switching to a specified one of the transmission speeds, and in which the modulated wave is transmitted to the receiving station so that a demodulated code by a demodulator of any of the transmission speeds may be interpreted as the code train indicating the specified transmission speed to be selected by the receiving station, thereby switching the transmission speed to the specified one corresponding to the result of the interpretation.

3 Claims, 11 Drawing Figures

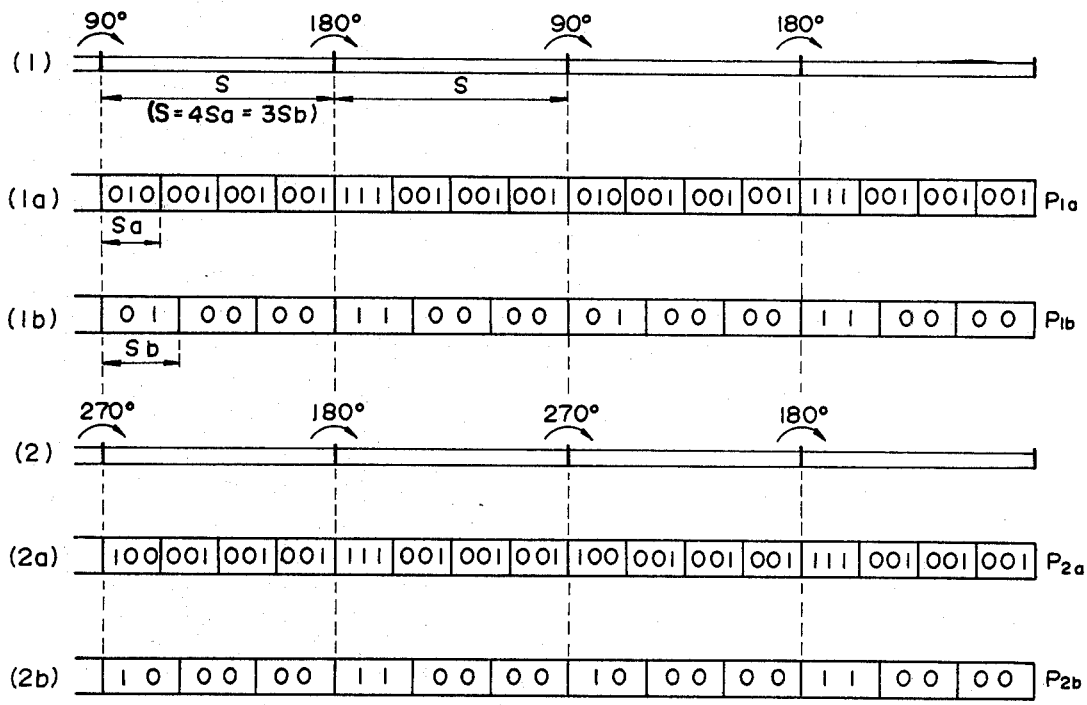

Fig. 5A

| Q₂ | Q₃ | Q₄ | PHASE CHANGE |
|---|---|---|---|
| 0 | 0 | 1 | 0° |
| 0 | 0 | 0 | 45° |
| 0 | 1 | 0 | 90° |
| 0 | 1 | 1 | 135° |
| 1 | 1 | 1 | 180° |
| 1 | 1 | 0 | 225° |
| 1 | 0 | 0 | 270° |
| 1 | 0 | 1 | 315° |

Fig. 5B

| ABSOLUTE PHASE | $Q_1$ | RELATIVE SIGNAL ELEMENT AMPLITUDE |
|---|---|---|
| 0°, 90° | 0 | 3 |
| 180°, 270° | 1 | 5 |
| 45°, 135° | 0 | $\sqrt{2}$ |
| 225°, 315° | 1 | $3\sqrt{2}$ |

Fig. 5C

| DATA BITS | | QUABITS $Q_1$ | $Q_2$ | $Q_3$ | $Q_4$ | PHASE CHANGE |
|---|---|---|---|---|---|---|
| 0 | 0 | 0 | 0 | 0 | 1 | 0° |
| 0 | 1 | 0 | 0 | 1 | 0 | 90° |
| 1 | 1 | 0 | 1 | 1 | 1 | 180° |
| 1 | 0 | 0 | 1 | 0 | 0 | 270° |

TRANSMISSION SPEED SWITCHING SYSTEM

This invention relates to a transmission speed switching system in a transmission system having a plurality of data MODEMs of different transmission speeds.

In telegraphy, data circuits, facsimile or like transmission systems, it is efficient, in general, to achieve transmission at a maximum speed of the transmission line used but it is effective in many cases to perform error-free transmission at a medium or low speed in accordance with variations in the state of the transmission line.

It is customary in the prior art to predetermine a specified one of a plurality of transmission speeds by both the transmitting and receiving stations and to switch the transmission speed by a manual operation to the predetermined one for subsequent communications. However, such a method involves troublesome manual operations and, on top of that, has the fatal in that an automatic receiving function is impossible in a case where the operator of the other party is absent.

An object of this invention is to provide a transmission speed switching system which is free from the abovesaid defects of the prior art and is capable of automatically switching the speed of a transmitter or a receiver of the other party to a speed designated by the transmitting station.

This invention will hereinafter be described in detail with reference to the accompanying drawings, in which:

FIGS. 1A and 1B show the relationships among combinations of transmission codes and phase changes for use in this invention;

FIG. 2 shows time charts explanatory of the principles of this invention in a case of using the relationships shown in FIG. 1;

FIGS. 5A, 5B and 5C show a series of tables explanatory of other code transmission methods for use in this invention.

Figure 3A:
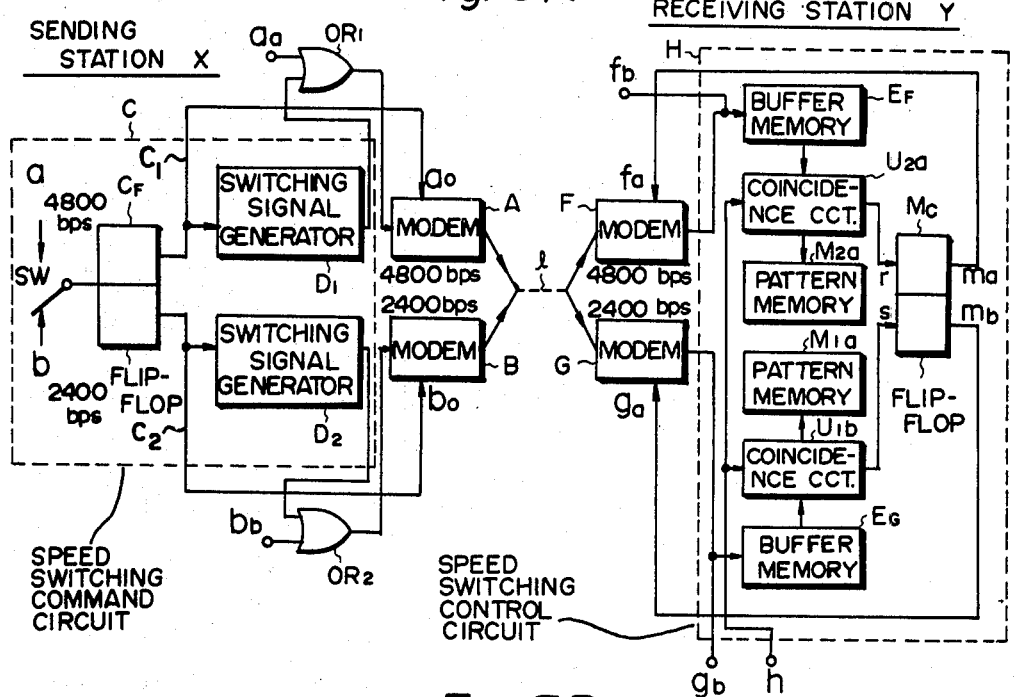
FIG. 3A is a block diagram illustrating an embodiment of this invention.

In the Recommendation V-27ter of the International Telegraph and Telephone Consultative Committee (hereinafter referred to as CCITT), a data transmission MOD/DEMOD system using a telephone circuit is defined to be a phase modulation system having two kinds of transmission speeds of 4800 bps and 2400 bps.

In a case of the transmission speed of 4800 bps, an 8-phase differential modulation system is employed to transmit combinations of 3-bit codes (tribits) corresponding to phase changes as shown in FIG. 1A. Accordingly, the modulation rate used is 1600 bauds, that is, the symbol interval Sa of tribits is 1/1600 sec. In a case of the transmission speed of 2400 bps, a 4-phase differential modulation system is used to transmit combinations of 2-bit codes (dibits) corresponding to phase changes as shown in FIG. 1B. Accordingly, the modulation rate is 1200 bauds, that is, the symbol intervals Sb of dibits is 1/1200 sec.

As described above, the Recommendation V.27ter defines two kinds of transmission speeds by two kinds of modulation systems. Generally, in a case of data transmission from one station X to the other station Y, since it is unknown at the station X which speed is set for a data MODEM of the station Y, it is also unknown which transmission speed should be selected by a command to be sent to the station Y. This invention is designed such that the station X sends out a command designating a desired speed even if it is unknown to which speed the station Y is set, as mentioned above, and that the station Y can interpret the command and select a MODEM of the speed specified by the station X.

FIG. 2 illustrates a series of time charts explanatory of the principles of the present invention. Charts (1) and (2) in FIG. 2 show modulated waves for the speed switching which are transmitted from the station X; (1a) and (2a) show demodulated codes detected when the station Y receives the modulated waves by a MODEM of 4800 bps; and (1b) and (2b) similarly show demodulated codes provided when the modulated waves are received by MODEM of 2400 bps at the station Y.

Now, let it be assumed that the carrier phase of the transmitted signal from the station X is changed by 90°, 180°, 90° and 180° at time intervals S as shown by the chart (1) in FIG. 2. In this instance, the time S $$S = 4Sa = 3Sb$$

is selected to be a common multiple of the symbol interval Sa of 4800 bps and the symbol interval Sb of 2400 bps so that the time S may be equal to four times the symbol interval Sa and equal to three times the symbol interval Sb.

In a case where the station Y receives the abovesaid signal by the MODEM of 4800 bps, such a code pattern $P_{1a}$ as shown by a chart (1a) in FIG. 2, that is, a demodulated code "01000100100111100100100101010 . . . ", is produced in correspondence to the demodulated codes shown by FIG. 1A. In a case of receiving the signal by the MODEM of 2400 bps, such a code pattern $P_{1b}$ as shown by a chart (1b) in FIG. 2, that is, a demodulated code "01000011000001 . . . ", is provided in correspondence to the demodulated codes depicted by the FIG. (1b).

If the carrier phase of the transmitted signal from the station X is similarly changed in the manner illustrated by a chart (2) in FIG. 2, there is obtained in the station Y a demodulated signal of a pattern $P_{2a}$ shown by a chart (2a) in FIG. 2, that is, "10000100100111100100100100 . . . " or a pattern $P_{2b}$ depicted by a chart (2b) in FIG. 2, that is "10000011000010 . . . ", depending upon whether reception is by the MODEM of 4800 bps or 2400 bps.

If the rule is established in advance so that the transmission of the modulated wave (1) or (2) shown in FIG. 2 from the station X to the station Y designates a fact that the transmission speed of the MODEM to be next used is of 4800 bps or 2400 bps, respectively, then the station Y can interpret the modulated wave as such a command that in a case of operating by the MODEM of 4800 bps, the transmission speed of 4800 bps should be still used or switched to 2400 bps for the subsequent reception, depending upon whether the demodulated code pattern is $P_{1a}$ or $P_{2a}$. Similarly, in a case of operating by the MODEM of 2400 bps, the station Y interprets the modulated wave as such a command that the transmission speed of 2400 bps should be switched to 4800 bps or still used for the subsequent reception in dependence upon whether the demodulated code pattern is $P_{1b}$ or $P_{2b}$. In a case where the MODEM of the transmitting side is set at 4800 bps or 2400 bps for the carrier phase change in the station X, if the waveform (1) of FIG. 2 is used, the pattern $P_{1a}$ or $P_{1b}$ is fed to the transmitting MODEM and if the waveform of FIG. 2 is used, the input code $P_{2a}$ or $P_{2b}$ is applied to the transmitting MODEM.

In other words, according to the present system, if the abovesaid speed switching command, which is modulated at time intervals of the common multiple of the symbol intervals of different transmission speeds to be employed at the station X, is sent out therefrom, the station Y can interpret the command to automatically switch the transmission speed according to the interpreted command in disregard of the set speed of the receiving MODEM.

The above example is described in connection with a case of two kinds of transmission speeds, but the number of speeds can be increased, of course. Further, in the present invention, the phase changes for the transmission speed switching are determined as shown in FIG. 2, but the phase changes can be provided in a variety of combinations and they are required only to permit the receiving station to readily decide the code transmitted.

Moreover, if a wave which includes phase changes of 0° and 180° at intervals of the time S is sent out as a prefix of the command transmission prior to the speed switching command, a notice of sending of the switching signal can be given from a sending station to a receiving station.

Figure 3B:
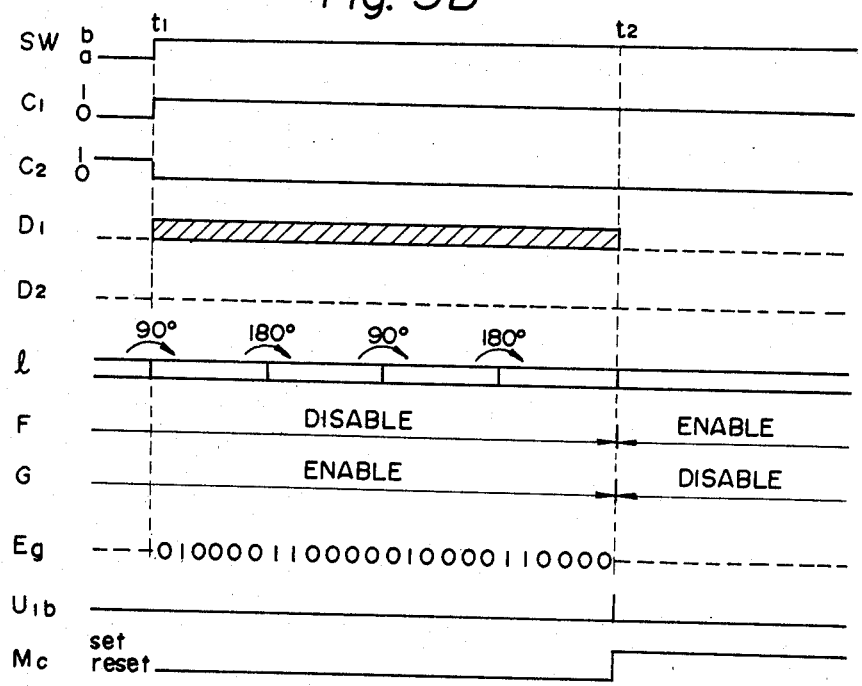
FIG. 3B shows time charts explanatory of the operation of the embodiment shown in FIG. 3A.

FIGS. 3A and 3B are a block diagram illustrating an embodiment of this invention and time charts explanatory of the operation of this embodiment. In FIG. 3A, reference characters A and B of the transmitting station X indicate MODEMs having transmission speeds a (4800 bps) and b (2400 bps), respectively; $OR_1$ and $OR_2$ corresponds to OR gates, respectively; C designates a speed switching command circuit; F and G of the receiving station Y identify MODEMs having the transmission speeds a and b, respectively; and H denotes a speed switching control circuit. Reference characters $S_W$, $C_F$, $D_1$ and $D_2$ in the speed switching command circuit C represent a command switch for switching the transmission speed, a flip-flop, a switching signal generator for 4800 bps and a switching signal generator for 2400 bps, respectively. Reference characters $E_F$ and $E_G$, $M_{2a}$ and $M_{1a}$, $U_{2a}$ and $U_{1b}$, and $M_C$ in the speed switching control circuit H of the station Y show buffer memories for storing demodulated codes from the MODEMs F and G, pattern memories for storing code patterns corresponding to the code patterns (2a) and (1b) shown in FIG. 2, coincidence circuits and a flip-flop, respectively.

Next, the operation of the illustrated embodiment will be described in connection with a case of switching the transmission speed from 2400 bps to 4800 bps. When the switch $S_W$, which has been held at the side of the contact b during transmission at the speed of 2400 bps, is turned down by a switching command for 4800 bps to the side of the contact a at the time $t_1$ depicted in FIG. 3B, the output $C_1$ from the flip-flop $C_F$ is inverted from the state "0" to the state "1" while the output $C_2$ is inverted from the state "1" to the state "0". The state "0" of the output $C_2$ does not provide any control to the switching signal generator $D_2$ and this output $C_2$ is applied to a control terminal $b_o$ of the MODEM B, whereby the MODEM B of 2400 bps having operated until then is disabled to provide therefrom no output. On the other hand, the output $C_1$ of the state "1" is applied to a control terminal $a_o$ of the MODEM A, whereby the MODEM A of 4800 bps is put in its enabled state, that is, the operative state and, at the same time, the switching signal generator $D_1$ is actuated to provide a drive signal indicated by $D_1$ in FIG. 3B, generating a switching modulated signal for switching the transmission speed from the MODEM A. This signal is indicated by 1 in FIG. 3B and is the same signal as shown by the chart (1) in FIG. 2 which has phase changes at intervals of the time S (which will hereinafter be referred to as the system interval) equal to the 4-symbol intervals at the transmission speed of 4800 bps. This signal is transmitted to the station Y over a transmission line 1. In the station Y, since communication has been effected at the transmission speed of 2400 bps until then, the MODEM F of 4800 bps is held in the disabled state but the MODEM G of 2400 bps is in the enabled state, so that the MODEM G demodulates the abovesaid switching modulated signal for transfering the demodulated result to the buffer memory $E_G$. On the other hand, the code pattern (1b) shown in FIG. 2 is stored in the pattern memory $M_{1b}$ as mentioned above and this pattern is identical with the code pattern "0100001100000100001100000" obtained by demodulating the speed switching signal for 4800 bps by the MODEM G of 2400 bps according to the foregoing description. In the present embodiment, when the demodulated pattern of the buffer memory $E_G$ and the memory pattern of the pattern memory $M_{1b}$ match with each other for the period of the 4-system interval, that is, at the time $t_2$ in FIG. 3B, the coincidence circuit $U_{1b}$ provides a coincidence detecting pulse. This output pulse is applied to a set terminal s of the flip-flop $M_C$ to set it. Then, the outputs at output terminals $m_a$ and $m_b$ of the flip-flop $M_C$ are inverted from the state "0" to the state "1" and from the state "1" to the state "0", respectively, to apply control signals to the MODEMs F and G from control terminals $f_a$ and $g_a$, enabling the MODEM F of 4800 bps and disabling the MODEM G of 2400 bps. In other words, upon reception of the switching signal, the operation path of the receiving station Y is switched from the MODEM G of 2400 bps to the MODEM F of 4800 bps to make it possible to receive the modulated signal transmitted at the transmission speed of 4800 bps. In this case, a message information signal of 4800 bps is applied through the OR gate $OR_1$ to the MODEM A. The modulated output of the MODEM A is transmitted through the line 1 to the MODEM F, so that the demodulated message information signal is obtained from a terminal $f_b$.

Switching of the transmission speed from 4800 bps to 2400 bps is also achieved on the similar operating principles. In this case, a message information signal of 2400 bps is applied through the OR gate $OR_2$ to the MODEM B. The demodulated message information signal is obtained from a terminal $g_b$.

If the transmission speed is about to switch during the transmission of the message signal, the carrier, from the MODEM A or B by way of examples, is temporarily interrupted. In this case, an inhibit signal applied from a terminal h is also interrupted during a short time by an appropriate circuit (not shown) after the reception of the regenerated carrier by the MODEM F or G. Within this short time, the above coincidence detection operation is performed. As mentioned above, the switching operation of the transmission speed can be performed with high reliability by the same transmission line as the message transmission line. To differentiate the switching modulation signal from the message information signal, the aforementioned prefix may be employed for the automatic switching operation.

Figure 3C:
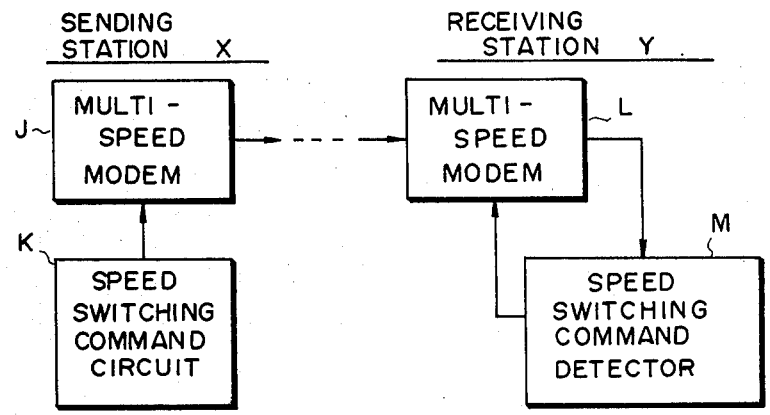
FIGS. 3C and 4 are block diagrams illustrating other embodiments of this invention.

FIG. 3C illustrates another embodiment of this invention, in which a MODEM J at the transmitting side and a MODEM L at the receiving side are multi-speed MODEMs which can be switched to one of a plurality of speeds a, b, c, . . . i. Reference characters K and M indicate a speed switching command circuit and a speed switching command detector, respectively.

For setting of the transmission speed, if a switching command signal for the speed a, for instance, is generated by the speed switching command circuit K, the MODEM J at the sending side is switched to the MODEM of the transmission speed a, sending out a speed switching command to the receiving station Y. The modulated wave in this case is one which is modulated at time intervals of a common multiple of the symbol intervals $S_a, S_b, S_c, \ldots S_i$ corresponding to the transmission speeds a, b, c, . . . i, respectively, as described previously. The MODEM L of the receiving station Y receives this signal and the speed switching command detector M detects the demodulated signal therefrom to switch the speed of the MODEM of the receiving side Y to the speed a.

Further, a variety of applications of this invention can be achieved by predetermining the switching control procedures, such as independent setting of the transmission speeds of the forward direction path and the reverse direction path in a full or half duplex communication system, the designation of the transmission speed of the sending side by a command signal from the message receiving station and so on. In this instance, it is possible to command the transmitting station to achieve the sending-out operation at a proper transmission speed in accordance with the received signal quality, such as the code error rate, the quantity of distortion, detected at the side of the message receiving station.

Figure 4:
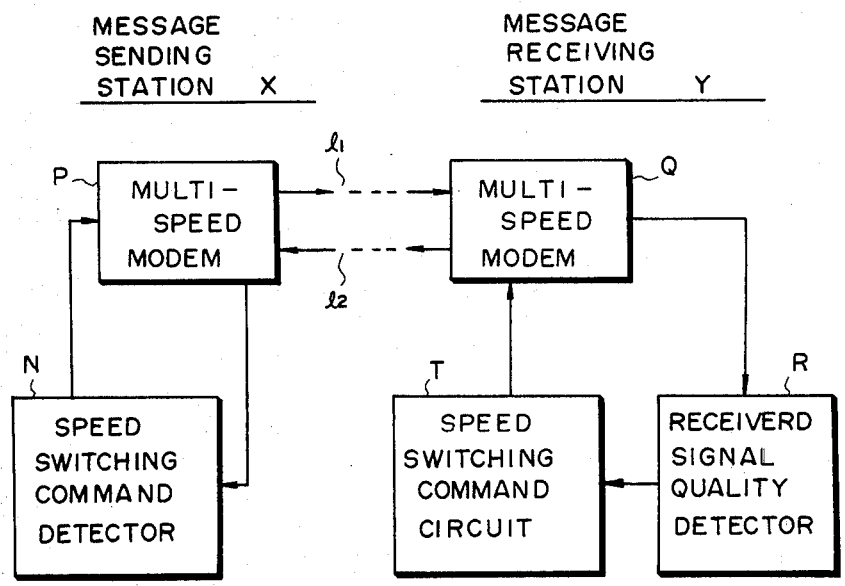

FIG. 4 is a block diagram showing another embodiment of this invention in which the transmission speed is automatically switched to a proper speed in accordance with the received signal quality. The message sending station X and the message receiving station Y are interconnected via transmission lines $l_1$ and $l_2$ to perform two-way transmission. MODEMs P and Q of the both stations are multi-speed MODEMs which can be switched to one of a plurality of speeds a, b, c, . . . i. Reference character N identifies a speed switching command detector similar to the speed switching control circuit H shown in FIG. 3A; R designates a received signal quality detector, of the type disclosed in U.S. Pat. No. 3,987,422 issued for a "System For Detecting Signal Quality Of A Phase—Modulated Wave", for deciding the magnitude of errors, distortion or the like of the received signal by the use of known circuitry; and T denotes a speed switching command circuit similar to the speed switching command circuit C shown in FIG. 3A.

Now, if information is transmitted from the station X to the station Y, for example, at the speed a and if signal degradation from a predetermined threshold value is detected by the received signal quality detector R of the station Y, the detector R applies a control signal to the speed switching command circuit T to instruct the station X via the transmission line $l_2$ to switch the transmission speed, for example, to b. The signal waveform in this case is modulated at time intervals of a common multiple of the symbol intervals of respective speeds, as described previously. The station X decodes the command signal by the MODEM P and applies the decoded codes to the switching command detector N, which interprets the command for switching to the speed b and provides a control signal to the MODEM P, switching the transmission speed to b. Thus, in this transmission system, an optimum transmitting path is provided by switching the transmission speed by deciding the received signal quality.

This invention is applicable not only to the phase modulation (PSK) such as mentioned in the Recommendation V27ter of CCITT but also to other modulation systems. Next, a description will be given in connection with an example of the transmission speed switching system of this invention as being applied to the so-called QAM modulation system using a combined amplitude-phase modulation system.

In the Recommendation V.29 of CCITT, the amplitude-phase modulation system (QAM system) having three kinds of transmission speeds of 9600 bps, 7200 bps and 4800 bps are defined as a MOD/DEMOD system for data transmission using a private line.

In the case of the transmission speed of 9600 bps, a first bit $Q_1$ is transmitted by amplitude modulation and second, third and fourth bits $Q_2, Q_3$ and $Q_4$ are modulated by 8-phase modulation in a manner to correspond to the phase changes shown in FIG. 5A and then a combination of codes composed of these four bits (quabits) is sent out. The method of amplitude modulation is to provide amplitudes corresponding to the absolute phases in accordance with the state "1" or "0" of the first bit $Q_1$, as shown in FIG. 5B. In a case of the transmission speed of 7200 bps, the first bit $Q_1$ of the abovesaid quabits is used to represent the amplitude value corresponding to the data "0" and a combination of 3-bit codes (tribits) is sent out by the 8-phase modulation method. Moreover, in a case of the transmission speed of 4800 bps, the first bit $Q_1$ of the abovesaid quabits is employed to represent the amplitude value corresponding to the data "0" and a combination of 2-bit codes (dibits) is sent out by the 4-phase modulation method shown in FIG. 5C. In this instance, the fourth bit $Q_4$ is decided to have an inverted value of a modulo 2 of $Q_2 + Q_3$.

With such a modulation system of the Recommendation V.9, combinations of 4-bit, 3-bit and 2-bit codes are sent respectively corresponding to the transmission speeds of 9600 bps, 7200 bps and 4800 bps, so that the symbol interval is 1/2400 sec. for all of the transmission speeds.

Figure 6:
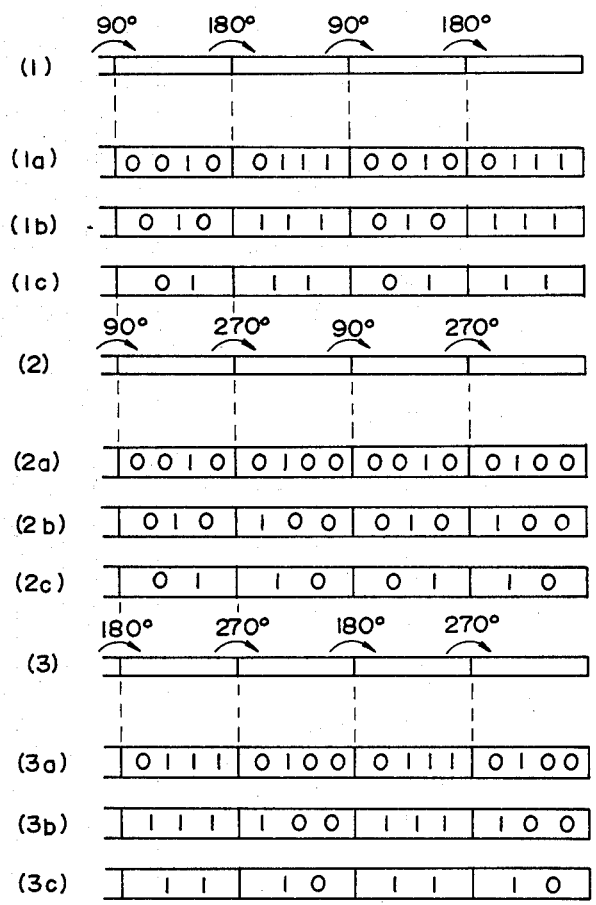
FIG. 6 shows time charts showing a specific operative example in the case of using the code transmission method shown in FIG. 5.

FIG. 6 shows time charts explanatory of an example of this invention applied to the system of the Recommendation V.29. Charts (1), (2) and (3) in FIG. 6 show modulated waveforms sent out from the station X for instructing the station Y to switch the transmission speed to 9600 bps, 7200 bps and 4800 bps, respectively. The amplitudes are all modulated so that the bit $Q_1$ is the data "0". In this case, the phase changes are each provided at intervals of the time S equal to the symbol interval of respective speed. When receiving the switching signals (1), (2) and (3) by the MODEMs of 9600 bps, 7200 bps and 4800 bps, respectively, the station Y demodulates the signals as such code patterns as shown in FIG. 6 by charts (1a), (1b) and (1c), charts (2a), (2b) and (2c) and charts (3a), (3b) and (3c), respectively. Accordingly, if the corresponding relationships of the received code patterns to the transmission speeds to be selected are predetermined between the two stations, the station Y is capable of identifying the speed to be selected regardless of the speed of the MODEM being actuated.

As has been described in detail above, when this invention is applied to a transmission system using MODEMs of different transmission speeds, codes modulated at intervals of the time S corresponding to a common multiple of the symbol intervals of respective transmission speeds as predetermined are transmitted, permitting the receiving station to identify the transmission speed to be selected for automatic speed switching. Further, this invention is also applicable to a case of switching the transmission speed in accordance with the quality of a received signal, and hence is capable of achieving efficient and good quality transmission of data, facsimile and telegraphy.

What we claim is:

1. A transmission speed switching system comprising:

a plurality of first multi-phase modulation data MODEMs of different transmission speeds $b_1, b_2, \ldots b_n$ each operating in a multi-phase modulation mode and connected to a transmission line at one party of a communication system formed through said transmission line, one of said first data MODEMs being activated in correspondence to an instant one of the transmission speeds;

a plurality of second multi-phase modulation data MODEMs of said transmission speeds $b_1, b_2, \ldots b_n$ each operating in a multi-phase modulation mode and connected to said transmission line at the other party of said communication system, only one of said second data MODEMs being activated in correspondence to an instant one of the transmission speeds;

modulation means connected to said first data MODEMs to modulate a carrier by a code train at intervals of a time S equal to a common multiple of symbol intervals $S_1, S_2, \ldots S_n$ respectively corresponding to the transmission speeds in a manner to obtain a predetermined modulated wave which instructs the activated one of said second MODEMs for switching to a specified one of the transmission speeds;

demodulation means connected to the activated one of said second data MODEMs to demodulate said predetermined modulated wave through said activated one of said second data MODEMs to provide said code train; and control means connected to said demodulation means and said second MODEMs to activate only one of said second MODEMs indicated by said code train.

2. A transmission speed switching system according to claim 1, further including means connected to said demodulation means and said second MODEMs to detect the received signal quality at said second MODEMs and to determine the specified transmission speed in accordance with said received signal quality.

3. In a communication system having a transmission station for transmitting at different speeds by transmitting a carrier modulated by different code trains having respective symbol intervals $S_i$ where $i = 1, 2, 3, \ldots n$, and a receiving station having a plurality of demodulators for receiving at different speeds by enabling a selected one of said demodulators, the improvement comprising a transmission speed switching system wherein said transmission speed switching system is comprised of: modulation means in the transmission station for modulating the transmitted carrier by a code train having a symbol interval S satisfying the relationship $S = a_i S_i$ for all i where $a_i$ are integers; demodulation means in the receiving station and cooperative with the enabled one of the demodulators in the receiving station for demodulating the carrier modulated by the code train having the symbol interval S and for developing an output code train indicative of transmission speed; and control means responsive to the output code train of said demodulation means for enabling a selected one of the demodulators of the receiving station corresponding to the transmission speed indicated by the output code train of said demodulation means.

* * * * *